United States Patent
Wong et al.

(10) Patent No.: US 6,208,444 B1
(45) Date of Patent: Mar. 27, 2001

(54) APPARATUS FOR WAVELENGTH DEMULTIPLEXING USING A MULTI-CAVITY ETALON

(75) Inventors: Seng-Ieong Wong, Plano; Jian-Yu Liu, Garland; Kuang-Yi Wu, Plano, all of TX (US)

(73) Assignee: Chorum Technologies Inc., Richardson, TX (US)

(*) Notice: Subject to any disclaimer, the term of this patent is extended or adjusted under 35 U.S.C. 154(b) by 0 days.

(21) Appl. No.: 09/391,733

(22) Filed: Sep. 8, 1999

Related U.S. Application Data (63) Continuation-in-part of application No. 09/274,270, filed on Mar. 22, 1999, which is a continuation-in-part of application No. 09/240,550, filed on Jan. 29, 1999, which is a continuation of application No. 08/739,424, filed on Oct. 29, 1996, now Pat. No. 5,867,291, which is a continuation-in-part of application No. 09/156,211, filed on Sep. 17, 1998, which is a continuation-in-part of application No. 09/048,557, filed on Mar. 26, 1998.

(51) Int. Cl.[7] ............................... H04J 14/02; H04J 14/06
(52) U.S. Cl. ........................ 359/127; 359/122; 359/589; 359/634
(58) Field of Search ..................................... 359/122, 127, 359/130, 128, 129, 131, 589, 634

(56) References Cited

U.S. PATENT DOCUMENTS

| | | |
|---|---|---|
| 4,919,522 | 4/1990 | Nelson . |
| 5,136,671 | 8/1992 | Dragone . |
| 5,363,228 | 11/1994 | DeJule et al. . |
| 5,381,250 | 1/1995 | Meadows . |
| 5,414,541 | 5/1995 | Patel et al. . |
| 5,488,500 | 1/1996 | Glance . |
| 5,596,661 | 1/1997 | Henry et al. . |
| 5,606,439 | 2/1997 | Wu . |
| 5,680,490 | 10/1997 | Cohen et al. . |
| 5,694,233 | 12/1997 | Wu et al. . |
| 5,809,190 | 9/1998 | Chen . |
| 5,867,291 | * 2/1999 | Wu et al. .............................. 359/124 |
| 5,978,116 | * 11/1999 | Wu et al. .............................. 359/124 |
| 5,978,529 | * 11/1999 | Taga et al. .............................. 385/24 |
| 6,005,995 | * 12/1999 | Chen et al. .............................. 385/24 |
| 6,115,401 | * 9/2000 | Scobey et al. .............................. 372/100 |
| 6,125,220 | * 9/2000 | Copner et al. .............................. 385/27 |
| 6,141,130 | * 10/2000 | Ip .............................. 359/179 |

OTHER PUBLICATIONS

Ammann, "Synthesis of Electro–Optic Shutters having a Prescribed Transmission vs Voltage Characteristic", Journal of the Optical Society of America (vol. 56, No. 8, pp. 1081–1088, Aug. 1966).

Harris et al., "Optical Network Synthesis Using Birefringent Crystals. *I. Synthesis of Lossless Networks of Equal-Length Crystals", Journal of the Optical Society of America (vol. 54, No. 10, pp. 1267–1279, Oct. 1964).

Senior et al., "Devices for Wavelength–Multiplexing and Demultiplexing", IEE Proceedings (vol. 136, Pt. J, No. 3, Jun. 1989).

(List continued on next page.)

*Primary Examiner*—Leslie Pascal
(74) *Attorney, Agent, or Firm*—Dorr, Carson, Sloan & Birney, P.C.

(57) ABSTRACT

A wavelength division demultiplexing device is presented utilizing a polarization-based filter or a multi-cavity etalon (e.g., a multi-cavity Fabry-Perot etalon) to obtain a flat-top filter response which can be utilized to create a flat-top slicer which separates out odd and even wavelengths, or upper and lower channels of an input WDM signal. The flat-top slicer can be used as the first stage of a cascaded network of wavelength demultiplexers in which following stages can be based on polarization-based filters, multi-cavity etalons, or other interferometric WDM devices, which are adequate due to the increased channel spacing obtained in the first stage of the network.

21 Claims, 12 Drawing Sheets

OTHER PUBLICATIONS

Nosu et al., "Optical FDM Transmission Technique", Journal of Lightwave Technology (vol. LT–5, No. 9, Sep. 1987).

Inque et al., "A Four–Channel Optical Waveguide Multi–Demultiplexer for 5–GHz Spaced Optical FDM Transmission", Journal of Lightwave Technology (Vol. 6, No. 2, Feb. 1988).

Chung et al., "Analysis of a Tunable Multichannel Two–Mode–Interference Wavelength Division Multiplexer/Demultiplexer", Journal of Lightwave Technology (vol. 7, No. 5, May 1989).

Damask et al., "Wavelength–Division Multiplexing using Channel–Dropping Filters", Journal of Lightwave Technology (vol. 11, No. 3, Mar. 1993).

M. Kuznetsov, "Cascaded Coupler Mach–Zehnder Channel Dropping Filters for Wavelength–Division–Multiplexed Optical Systems", Journal of Lightwave Technology (vol. 12, No. 5, Feb. 1994).

Takato et al., "Silica–Based Integrated Optic Mach–Zehnder Multi/Demultiplexer Family with Channel Spacing of 0.01–250 nm", IEEE Journal on Selected Areas in Communications (vol. 8(6), pp. 1120–1127, Aug. 1990).

Verbeek et al., "Integrated Four–Channel Mach–Zehnder Multi/Demultiplexer Fabricated with Phosphorous Doped $SiO_2$ Waveguides on Si", Journal of Lightwave Technology(vol. 6, No. 2, pp. 1011–1015, Jun. 1988).

* cited by examiner

Fig. 7
(Fabry-Perot Etalon Prior Art)

APPARATUS FOR WAVELENGTH DEMULTIPLEXING USING A MULTI-CAVITY ETALON

RELATED APPLICATIONS

The present application is a continuation-in-part of the Applicants' U.S. patent application Ser. No. 09/274,270, entitled "Method and Apparatus for Wavelength Multiplexing/Demultiplexing" filed on Mar. 22, 1999, which is a continuation-in-part of U.S. patent application Ser. No. 09/240,550, filed on Jan. 29, 1999, which is a continuation of U.S. patent application Ser. No. 08/739,424, filed on Oct. 29, 1996, now U.S. Pat. No. 5,867,291, issued on Feb. 2, 1999. The present application is also a continuation-in-part of the Applicants' U.S. patent application Ser. No. 09/156,211 entitled "Programmable Optical Add/Drop Multiplexer," filed on Sep. 17, 1998, and U.S. patent application Ser. No. 09/048,557, entitled "Programmable Optical Multiplexer," filed on Mar. 26, 1998

BACKGROUND OF THE INVENTION

1. Field of the Invention

The present invention relates generally to the field of optical communications. More specifically, the present invention discloses an apparatus for wavelength demultiplexing using a multi-cavity etalon.

2. Background of the Invention

Wavelength division multiplexing (WDM) is a commonly used technique that allows the transport of multiple optical signals, each at a slightly different wavelength, on an optical fiber. The ability to carry multiple signals on a single fiber allows that fiber to carry a tremendous amount of traffic, including data, voice, and even digital video signals. As an example, the use of wavelength division multiplexing permits a long distance telephone company to carry thousands or even millions of phone conversations on one fiber. By using wavelength division multiplexing it is possible to effectively use the fiber at multiple wavelengths, as opposed to the costly process of installing additional fibers.

In wavelength division multiplexing techniques, multiple wavelengths can be carried within a specified bandwidth. It is advantageous to carry as many wavelengths as possible in that bandwidth. International Telecommunications Union (ITU) Draft Recommendation G.mcs, incorporated herein by reference, proposes a frequency grid which specifies various channel spacings including 100 GHz and 200 GHz. It would be advantageous to obtain 50 GHz spacing. Separating and combining wavelengths with these close spacings requires optical components which have high peak transmission at the specified wavelengths and which can provide good isolation between separated wavelengths.

One technique which has been developed to accomplish the demultiplexing of closely spaced wavelengths is to cascade a series of wavelength division demultiplexing devices, each device having different wavelength separating characteristics. A typical application involves cascading an interferometric device such as an arrayed waveguide device having a narrow spacing of transmission peaks (e.g., 50 GHz) with a second interferometric device which has a coarser spacing and correspondingly broader transmission peaks (e.g., 100 GHz spacing). The cascade of devices provides the separation of wavelengths by subdividing the wavelengths once in the first device, typically into a set of odd and even channels, and then separating wavelengths in the subsets in following devices in the cascade.

Arrayed waveguide (AWG), fused biconical taper (FBT), fiber Bragg grating (FBG), diffraction grating, and other interferometric wavelength demultiplexing devices can be constructed to have the appropriate characteristics for the first or second stage devices in the cascade. However, traditional interferometric devices have the characteristic that as the spacing of the channels is decreased, the transmission peaks become narrower, and are less flat over the wavelength region in the immediate vicinity of each peak than a device with wider channel spacings. As a result, when using a traditional device in the first stage of a cascade, the transmission peaks may not have a high degree of flatness, and any drift or offset of a wavelength from its specified value may result in significant attenuation of that wavelength. In addition, the isolation between wavelengths is frequently unsuitable with conventional interferometric devices and can result in unacceptable cross-talk between channels.

With increasing numbers of wavelengths and the close wavelength spacing which is utilized in dense wavelength division multiplexing systems, attenuation and cross-talk must be closely controlled to meet the system requirements and maintain reliable operations. As an example, 40 or 80 wavelengths can be generated using controllable wavelength lasers, with transmission signals modulated onto each laser. It is desirable to be able to multiplex and demultiplex these channels onto one single optical fiber. Although the lasers can be controlled and the wavelengths stabilized to prevent one channel from drifting into another, there is always some wavelength drift which will occur.

In a cascade architecture, the first stage of demultiplexing, or the last stage of multiplexing are where good peak flatness and high isolation are required in order to allow the separation/combining of closely spaced wavelengths.

For the foregoing reasons, there is a need for a wavelength division multiplexing/demultiplexing device which tolerates wavelength drift, maintains a high degree of isolation between channels, and is able to separate/combine large numbers of wavelengths.

SUMMARY OF THE INVENTION

The present invention provides a system for wavelength division demultiplexing using either a polarization-based wavelength demultiplexing device or a multi-cavity etalon (e.g., a multi-cavity Fabry-Perot etalon) as a first stage, followed by at least a second stage of wavelength demultiplexing devices. The first stage device has transmission peaks which are substantially flat and provides a high degree of isolation between adjacent channels. The output of the first stage demultiplexing device is received by a second stage of wavelength demultiplexing devices which further separates the wavelengths into a plurality of subsets. One advantage of the present invention is that the first stage demultiplexing device has good peak flatness and low cross-talk, and permits separation of closely spaced wavelengths (e.g., 50 GHz spacing). The subsequent stage in the cascade can be based on a number of technologies including arrayed waveguide technology, fused biconical taper technology, diffraction grating technology, fiber Bragg grating technology, interference filters, or can also be polarization-based devices. The subsequent devices are used to separate channels that have been formed into subsets by the first stage wavelength demultiplexing device.

In a preferred embodiment the first stage wavelength demultiplexer creates two subsets, one subset containing the odd channels from the input channels, the other subset containing the even channels from the input channels. The second stage device further separates the wavelengths in the first and second subsets, resulting in a wavelength spacing at the output which is twice the wavelength spacing at the input of the first stage. Multiple stages can be used in the cascade to further separate the wavelengths and produce individual WDM channels at the final output.

When a large number of WDM channels are present, the first stage device can be utilized to separate the channels into groups, and subsequent stages can be used to continue the demultiplexing process. In a preferred embodiment, the present system separates an input signal into two groups of channels, the even channels and the odd channels. A subsequent stage based on arrayed waveguide (AWG) technology can be employed to perform the final multiplexing, resulting in individual WDM channels at the output.

In one embodiment the polarization-based wavelength division multiplexing/demultiplexing device is based on a polarization routing device which receives an optical signal carrying multiple channels at various wavelengths, separates the signal into vertical and horizontal polarizations, converts one of the polarizations to be identical to the other polarization, and performs filtering based on the wavelength of the signal, with the polarization of the output being dependent on the wavelength. A polarization routing stage routes light to a particular output depending on its polarization, and a polarization conversion and recombination stage combines the polarizations at each output to form an output signal.

One advantage of the present invention is that it allows the use of low cost interferometric devices in second and higher stages of the system by using a first stage device having good flatness and low cross-talk.

In a preferred embodiment a large number of channels (e.g., 40 or 80) with 100 GHz spacing enter the device and are separated according to even and odd channels by the first stage device with a spacing of 200 GHz. The second stage device is an arrayed waveguide device which separates the channels into individual channels which appear on the outputs, and which can be individually received by a telecommunications receiving device that is not wavelength selective.

These and other features and objects of the invention will be more fully understood from the following detailed description of the preferred embodiments which should be read in light of the accompanying drawings.

BRIEF DESCRIPTION OF THE DRAWINGS

The accompanying drawings illustrate the embodiments of the present invention and, together with the description, serve to explain the principles of the invention.

DETAILED DESCRIPTION OF THE INVENTION

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

When used herein, the term "multiplexer/demultiplexer" refers to a device which can be used to either combine or separate wavelengths. However, such a definition does not preclude the use of the device for one function only. In addition, non-reciprocal elements can be added, precluding use of the device for one of the functions of multiplexing or demultiplexing, although the features and functionality of multiplexer/demultiplexer remain the same in the direction of use.

When used in a cascade, the term "first stage" refers to the first stage of the cascade in a demultiplexing configuration, where closely spaced wavelengths enter the system and are separated. When used in a multiplexing configuration, the last stage of the system performs the final multiplexing of the wavelengths, and corresponds to the first stage of the demultiplexer. When used herein the term "first stage" refers to the first stage in a demultiplexing operation and to the last stage in a multiplexing operation. The term "flat-top slicer" refers to a wavelength multiplexing/demultiplexing device with a substantially square input port to output port transmission function.

Polarization-Based Wavelength Demultiplexer/Multiplexer.

Figure 1:
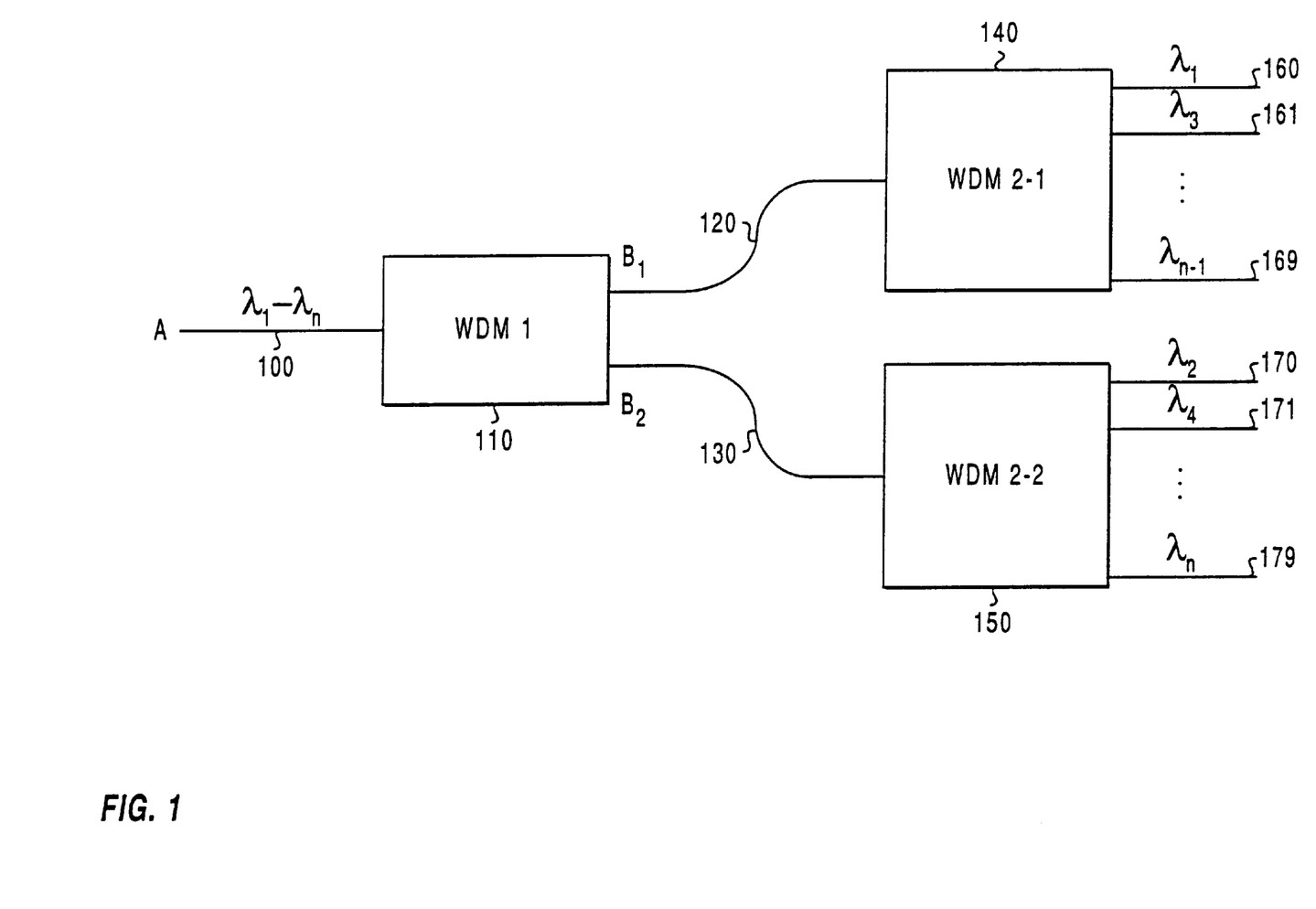
FIG. 1 illustrates the concept of wavelength slicing and cascading of WDM filters.

With reference to the drawings, in general, and FIGS. 1 through 6 in particular, the apparatus of the present invention is disclosed. FIG. 1 illustrates a cascade of wavelength division multiplexers (WDMs). A number of channels at wavelengths $\lambda_1$ through $\lambda_n$ appear at input port A 100 which is part of WDM 1 110. In a preferred embodiment WDM 1 110 separates out a first subset of odd numbered wavelengths which include $\lambda_1$ through $\lambda_{n-1}$ which appear on output port $B_1$ 120. Similarly, WDM 1 110 separates out a second subset of even numbered wavelengths which include $\lambda_2$ through $\lambda_n$ which appear on port $B_2$ 130. In an alternate embodiment the first set of wavelengths includes $\lambda_1$ through $\lambda_{n/2}$ and the second set of wavelengths includes $\lambda_{[(n/2)+1]}$ through $\lambda_n$.

Port $B_1$ 120 is coupled to WDM 2-1 140 which further separates out wavelength $\lambda_1$ which appears at port 160, wavelength $\lambda_3$ which appears at port 161, and remaining odd wavelengths through $\lambda_{n-1}$ which appears on port 169. Similarly, Port $B_2$ 130 is coupled to WDM 2-2 150 which further separates out wavelength $\lambda_2$ which appears at port 170, wavelength $\lambda_4$ which appears at port 171, and remaining even wavelengths through $\lambda_n$ which appears on port 179.

In an alternate embodiment the lower half of the wavelengths at input port A 100 are separated by WDM 2-1 140 and the upper half of the wavelengths at input port A 100 are separated by WDM 2-2 150.

Traditional interferometric devices suffer from the problem that as the transmission peak spacing is decreased, the flatness at the top of the transmission peak is reduced, due to the fact that the bandwidth at the top of the peak is reduced as a consequence of having more closely spaced peaks. While many WDM systems require that the variations in transmission be less than 0.5 dB over 0.3 nm or better, it is not generally possible to obtain such flatness using traditional interferometric devices. As a result, if there is any wavelength drift of any of the input signals, there will be subsequent attenuation due to the fact that the signal is no longer at a transmission peak. In addition, the isolation between signals at adjacent wavelengths can be unacceptable due to the fact that the attenuation at the bottom of the transmission curve is not low enough over a wide enough wavelength region. This reduced isolation can result in unacceptable cross-talk between channels.

Figure 2:
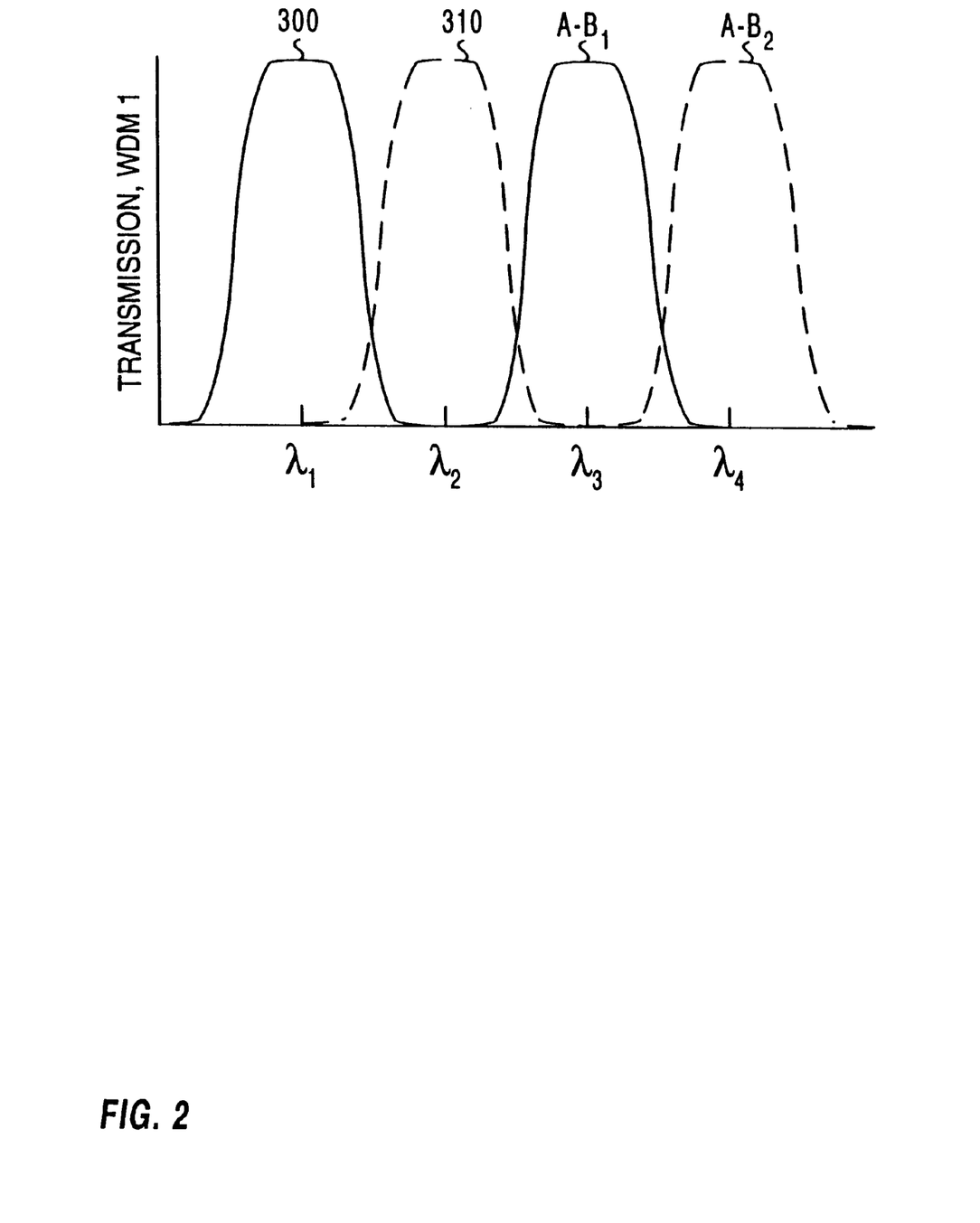
FIG. 2 is a graph illustrating the flat-top slicer spectral response.

The present invention avoids the aforementioned problems through the use of a flat-top slicer as WDM 1 110. The flat-top slicer provides a wavelength separating function which has adequate flatness and isolation. The transmission function for the flat-top slicer is illustrated in FIG. 2. Solid line 300 represents the transmission from port A 100 to port $B_1$ 120 in a flat-top slicer while dotted line 310 represents the transmission from port A 100 to port $B_2$ 130 in a flat top slicer.

In a preferred embodiment the flat-top slicer is realized based on a polarization-based wavelength multiplexing/demultiplexing device containing a polarization filter. Polarization filters provide the ability to obtain a tailored optical response as a function of wavelength and can provide superior performance over non-polarization based filters because they permit the use of polarization angle as well as path length (thickness) as a variable in creating the filter response. Polarization filters are typically embedded in an optical system which subsequently recombines the polarizations to produce a polarization independent device. Polarization filters are well understood by those skilled in the art, and are described in published books and literature, including the book by A. Yariv and P. Yeh entitled "Optical waves in crystals," which is incorporated herein by reference.

For example, the polarization filter can be composed of a plurality of birefringent elements, such as birefringent crystal plates (e.g., calcite or other birefringent crystalline materials). The polarization filter could also be made using a polarization fiber. A polarization mode dispersion compensator can be utilized in the device to reduce the polarization dispersion.

Figure 4:
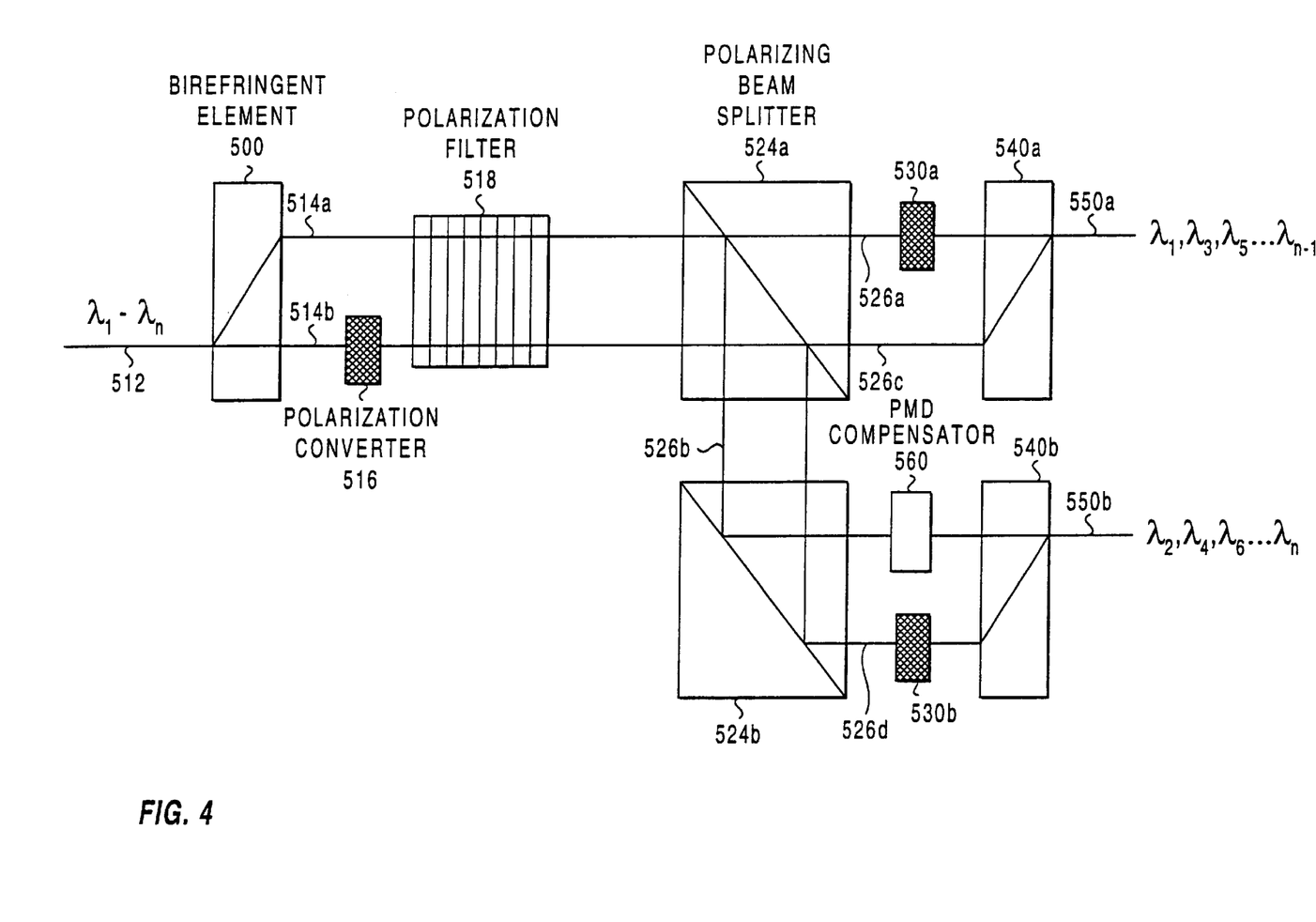
FIG. 4 is a diagram of one possible configuration for a wavelength slicer.

FIG. 4 illustrates a polarization-based wavelength multiplexing/demultiplexing device which can be used to realize the present invention. When used herein, the term flat-top slicer refers to such a polarization-based wavelength multiplexing/demultiplexing device or its equivalents. The flat-top slicer is employed as WDM-1 110. This device has been described in detail in U.S. Patent Application U.S. patent application Ser. No. 09/156,211 entitled "Programmable Optical Add/Drop Multiplexer," filed Sep. 17, 1998.

As shown in FIG. 4, an optical signal carrying eight optical channels 512 enters the system and is decomposed in a birefringent element 500 into two orthogonal polarization components, namely vertical and horizontal polarizations 514*a* and 514*b* respectively. One of the light paths 514*b* is passed through a polarization converter 516 such that both light paths have the same state of polarization (vertical or horizontal). These two beams then pass through a polarization filter 518 such that the odd-channels are coded with (output in) horizontal polarization and the even channels are coded with vertical polarization. These two polarizations are then separated by the following polarization beam separator (PBS), 524*a* which passes the horizontal polarization 526*a*, 526*c* straight through the PBS and deflects the vertical polarization 526*b*, 526*d* by 90°. Because the odd and even channels reside within the two polarizations respectively, they are spatially separated after the PBS.

In an alternate embodiment polarization filter 518 can be constructed to polarize code lower and higher channels differently, resulting in routing according to the channel position in the upper or lower parts of the input band.

Referring to FIG. 4 polarization converters 530*a*, 530*b* are used to convert polarizations by 90°, and birefringent elements 540*a* and 540*b* recombine the polarizations to produce odd numbered wavelengths at output port 550*a* and even numbered wavelengths at output port 550*b*. In a preferred embodiment polarization converters 530*a*, 530*b* are half wave plates.

Figure 5A:
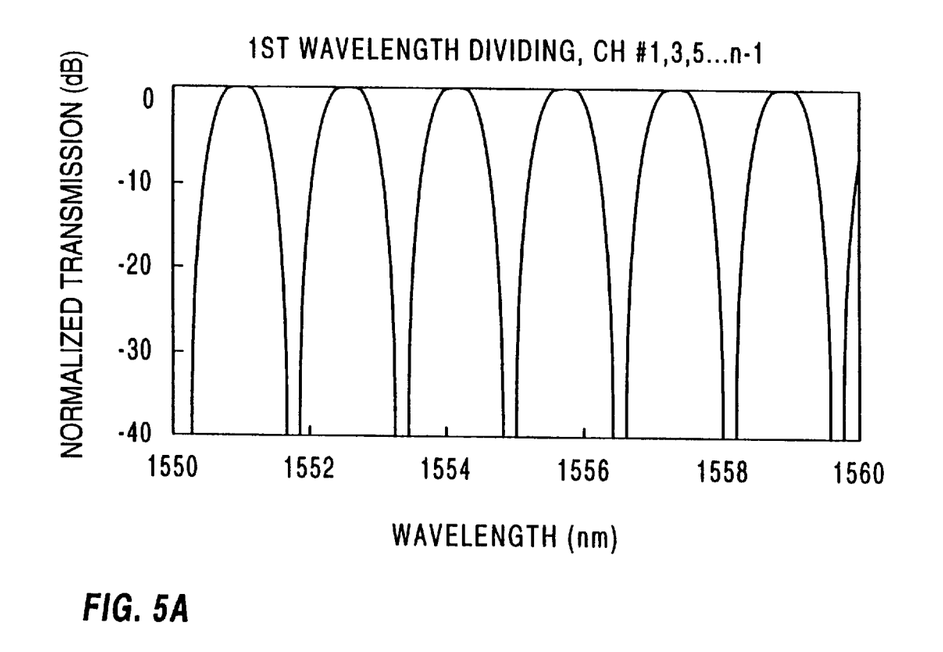
FIGS. 5a and 5b are graphs illustrating the spectral response for flat-top spectral slicers.
Figure 5B:
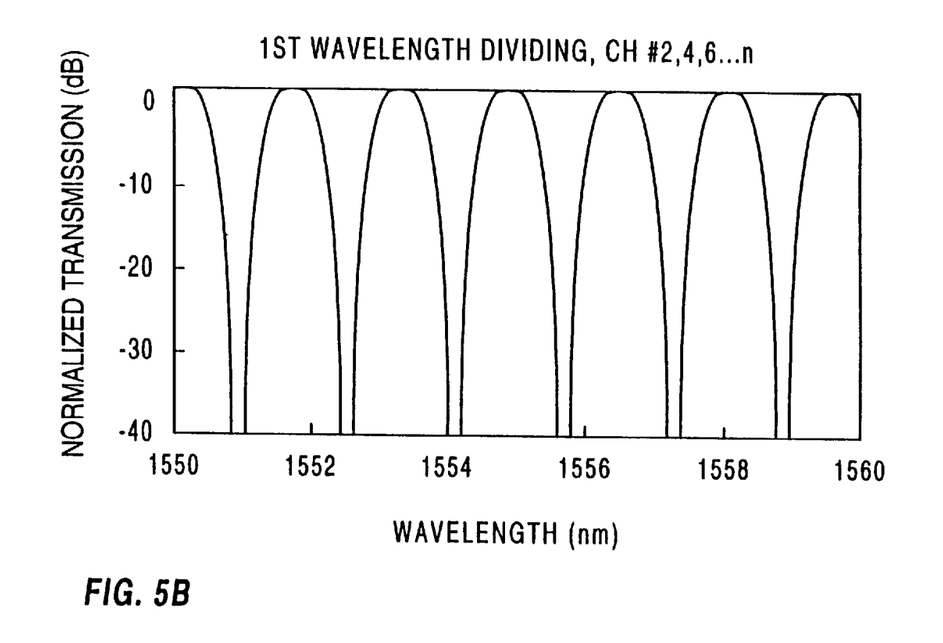

FIG. 5A illustrates the transmission characteristics of polarization filter 518 for light with a first (e.g., vertical) polarization, and FIG. 5B illustrates transmission through the filter 518 of this embodiment for a second (e.g., horizontal) polarization. The transmission envelopes are shaped to provide sufficient width, as depicted, to tolerate expected wavelength drift while still being sufficiently narrow to achieve the necessary discrimination with respect to other channels. In one embodiment, suitable filters may be made as described in U.S. Pat. No. 5,694,233 entitled "Switchable Wavelength Router," or U.S. patent application Ser. No. 09/020,706 entitled "Temperature Insensitive Polarization Filter," both incorporated herein by reference.

A polarization mode dispersion compensator 560 can be used as illustrated in FIG. 4. Polarization mode dispersion is defined as the difference in the propagation time between the two orthogonal polarization components. In a polarization-based routing device, different propagation delays may occur between two routes. As illustrated in FIG. 4, the propagation times resulting from the propagation path in the through port (output port 550*a*) are equal for both polarizations. On the other port (output port 550*b*), one of the polarization beams 526*d* passes through two half-wave plates, while the other 526*b* does not. To minimize the difference in propagation times for these two beams, a polarization mode dispersion (PMD) compensator 560 is inserted into path 526*b*. In a preferred embodiment, an isotropic glass plate is used to implement the PMD 560. Alternate materials can be used to realize the PMD compensator 560 and are known to those skilled in the art.

Figure 6:
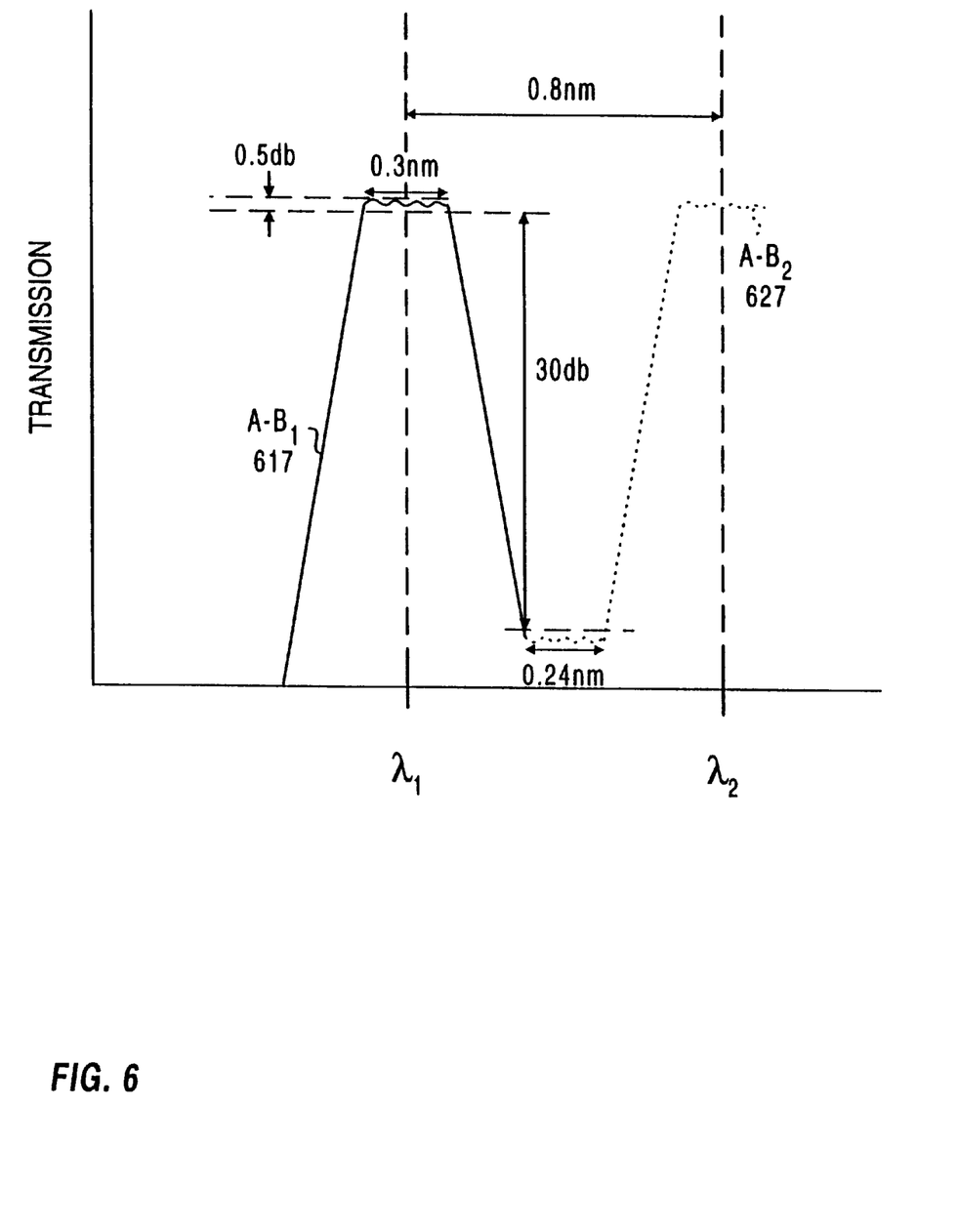
FIG. 6 is a graph illustrating the spectral response for a polarization-based wavelength separation device.

FIG. 6 illustrates in greater detail the transmission characteristics of a flat-top slicer when used with a channel spacing of 100 GHz (approximately 8 nm). At the transmission peak a flatness of 0.5 dB over a range of 0.3 nm can be obtained using a polarization filter in a polarization-based routing device. In terms of isolation, the transmission minimum can be 30 dB lower than the transmission value, and can remain that low over a 0.24 nm range between wavelength peaks. As a result, the flat-top slicer can tolerate wavelength drift and maintains low attenuation (high transmission) and low co-channel interference (low cross-talk). The solid portion 617 of the curve in FIG. 6 represents the transmission function from port A-B$_1$, while the dotted portion 627 represents the transmission function between ports A-B$_2$.

Figure 3:
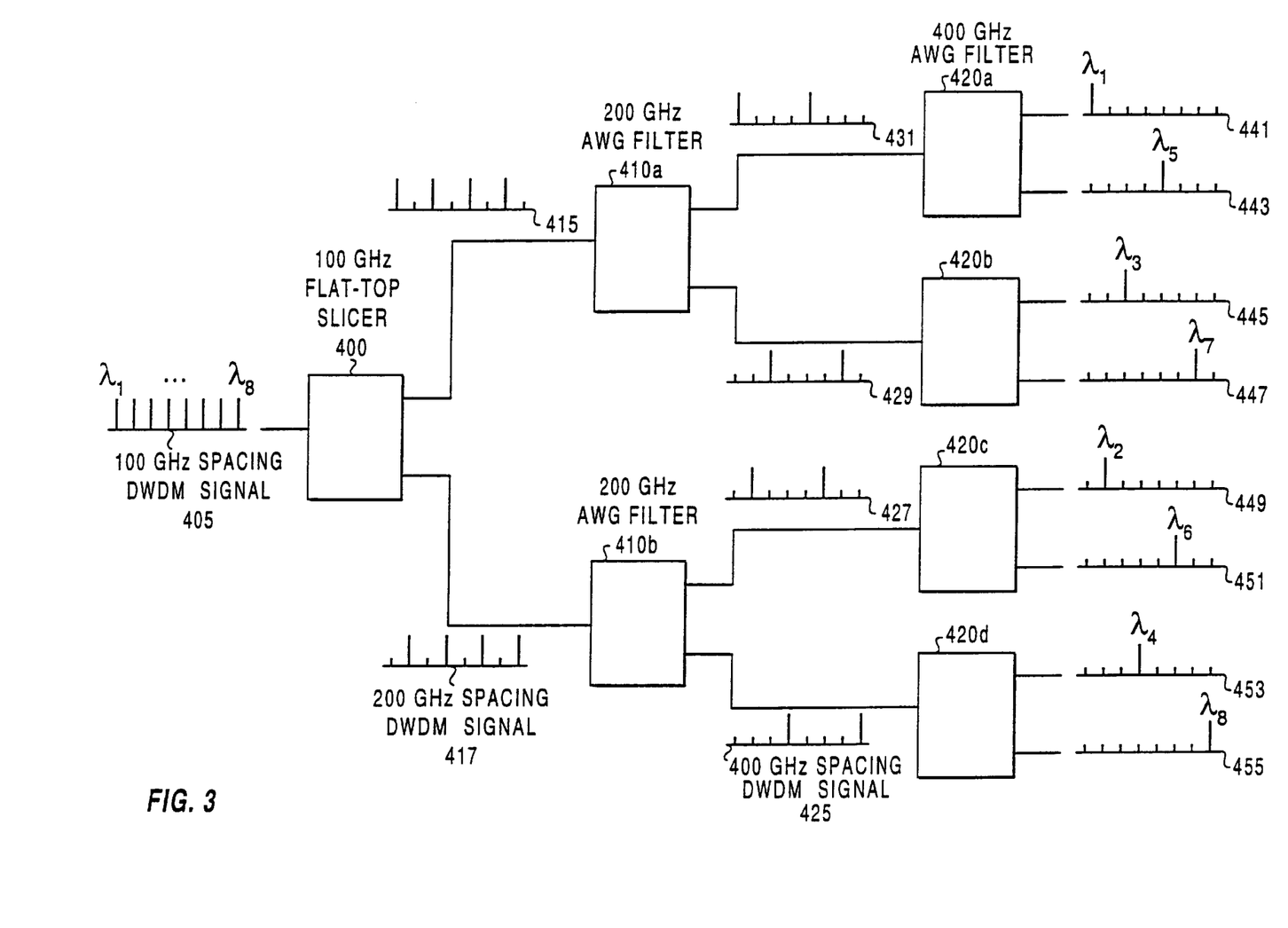
FIG. 3 is a diagram of a flat-top slicer followed by two stages of filters.

FIG. 3 illustrates one possible application of the present invention in which a 100 GHz spaced dense wavelength division multiplexing (DWDM) signal 405 enters a 100 GHz flat-top slicer 400, which produces an odd-channel 200 GHz spacing DWDM signal 415 and an even channel 200 GHz spacing signal 417. Two 200 GHz filters 410a, 410b are used to produce a 400 GHz spaced signal carrying wavelengths $\lambda_1$ and $\lambda_5$ 431, a signal carrying wavelengths $\lambda_3$ and $\lambda_7$ 429, a signal carrying wavelengths $\lambda_2$ and $\lambda_6$ 427, and a signal carrying wavelengths $\lambda_4$ and $\lambda_8$ 425. A third stage of filters 420a–d are used to produce the individual channels $\lambda_1$ through $\lambda_8$ on outputs 441, 449, 445, 453, 443, 451, 447 and 455 respectively. By using a flat-top slicer as the first stage for wavelength separation, good isolation and tolerance to wavelength drift is obtained. Subsequent stages can be based on alternate technologies, since the wavelengths have been separated by one channel spacing in flat-top slicer 400. In an alternate embodiment, the subsequent stages can be based on flat-top slicers using polarization-based filters in a polarization-based multiplexing/demultiplexing device. In yet another embodiment, the second and third stages are combined in one device, which can be based on arrayed waveguide (AWG) or an alternate technology.

Multi-Cavity Etalons.

FIGS. 7 through 14 relate to alternative embodiments of the present invention using a cascaded network of multi-cavity etalons for wavelength filtering.

Figure 7:
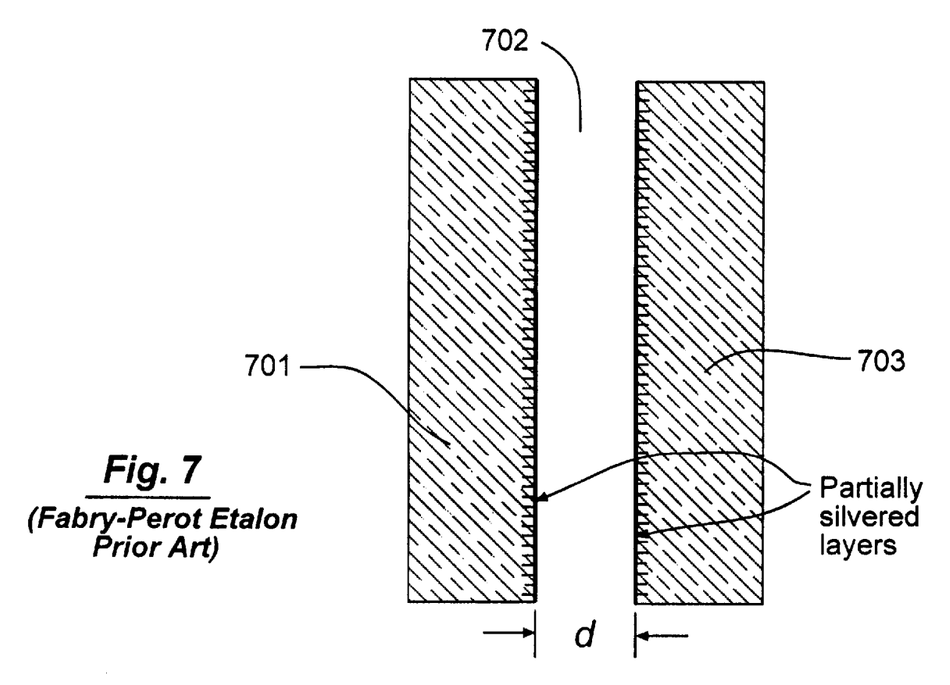
FIG. 7 is a cross-sectional view of a Fabry-Perot etalon.
Figure 8:
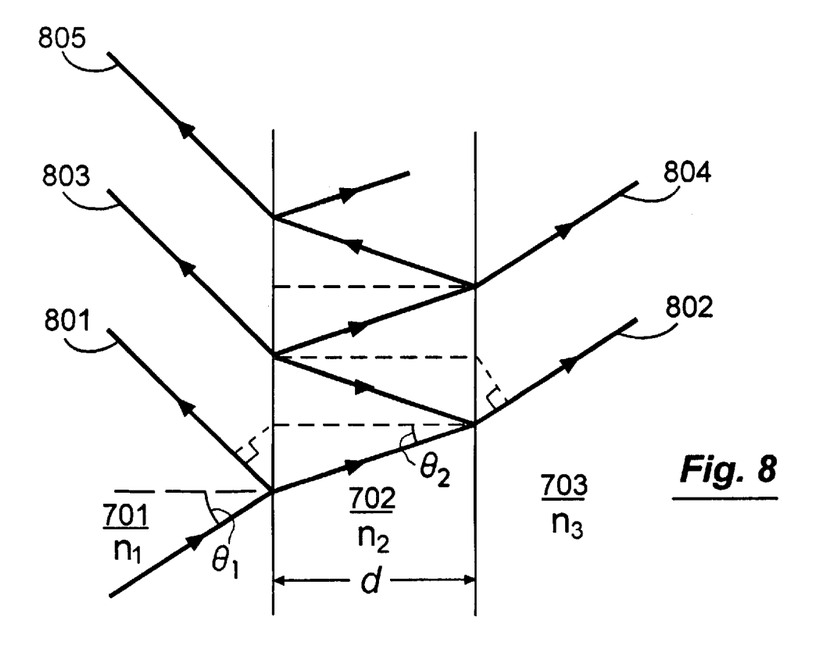
FIG. 8 is a cross-sectional diagram of multiple reflection of the input beam within a single-cavity Fabry-Perot interferometer.
Figure 9:
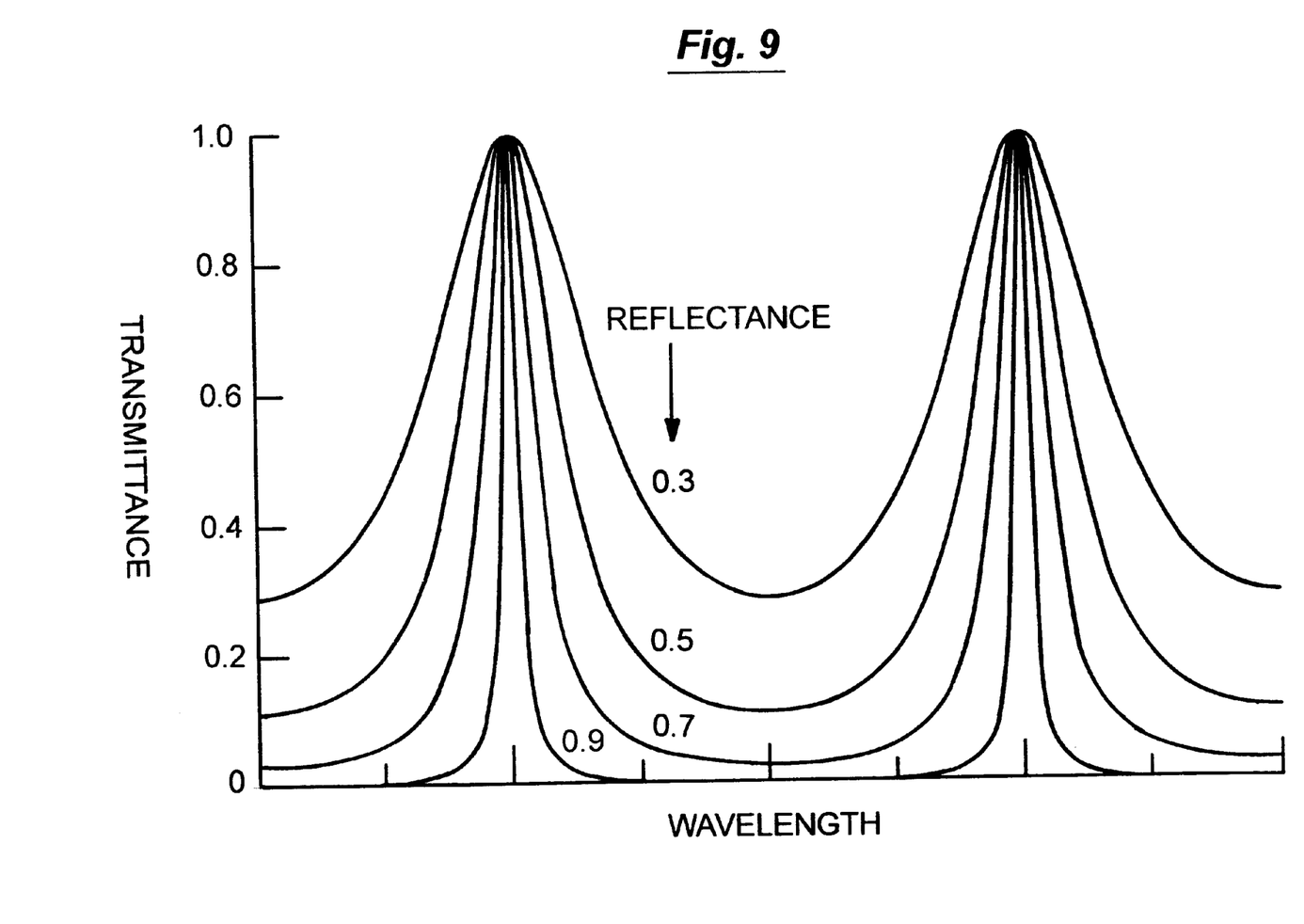
FIG. 9 is a graph showing transmittance of a Fabry-Perot etalon as a function of wavelength.

FIG. 7 is a cross-sectional diagram of a conventional single-cavity Fabry-Perot etalon having two outer transparent layers 701 and 703 separated by intermediate material or an air gap 702. The inner faces of the outer layers 701 and 703 are partially reflective. This results in multiple reflection and interference within the etalon. For example, FIG. 8 shows the beam paths within a single-cavity Fabry-Perot interferometer. Both the reflected beams 801, 803, 805, etc. and the transmitted beams 802, 804, etc. exhibit periodicity, (i.e., both the reflected and transmitted beams contain a plurality of peaks spaced at regular intervals). For example, FIG. 9 is a graph showing transmittance of a single cavity Fabry-Perot etalon as a function of wavelength. The reflected beam has a similar profile, but the peaks of the reflected beam are shifted so that they are in an alternating relationship with the transmitted peaks. In other words, each reflected peak is between two adjacent transmitted peaks, and vice versa. The wavelengths of the transmitted and reflected beams are determined by the dimensions and refractive indices of the materials used.

The major problem associated with a single cavity Fabry-Perot etalon, as well as other types of interference filters, is the narrowness of the peaks. This imposes unacceptably severe tolerances to ensure that the peaks accurately correspond to the WDM channels. As illustrated for example in FIG. 9, the width of each peak can be increased to a degree by decreasing the reflectance of the outer layers 701, 703 of the etalon, but this carries a high price in terms of increasing cross-talk between the transmitted and reflected signals.

Figure 10:
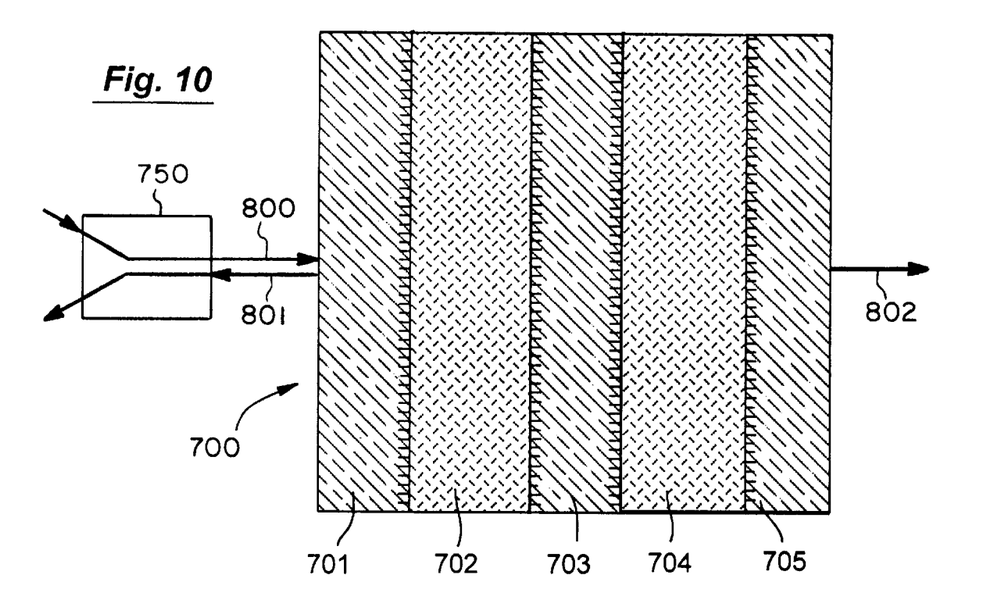
FIG. 10 is a cross-sectional view of a multi-cavity Fabry-Perot etalon.

To address this shortcoming, the present invention may employ a multi-cavity etalon 700 as a wavelength slicer or demultiplexer. An example of a two-cavity Fabry-Perot etalon 700 is illustrated in FIG. 10. In place of the single cavity 702 depicted in FIG. 7, the embodiment shown in FIG. 10 has two intermediate layers 702 and 704. As before, the faces of the adjacent layers 701, 703, and 705 adjacent to the intermediate layers 702, 704 are partially reflective.

Figure 11:
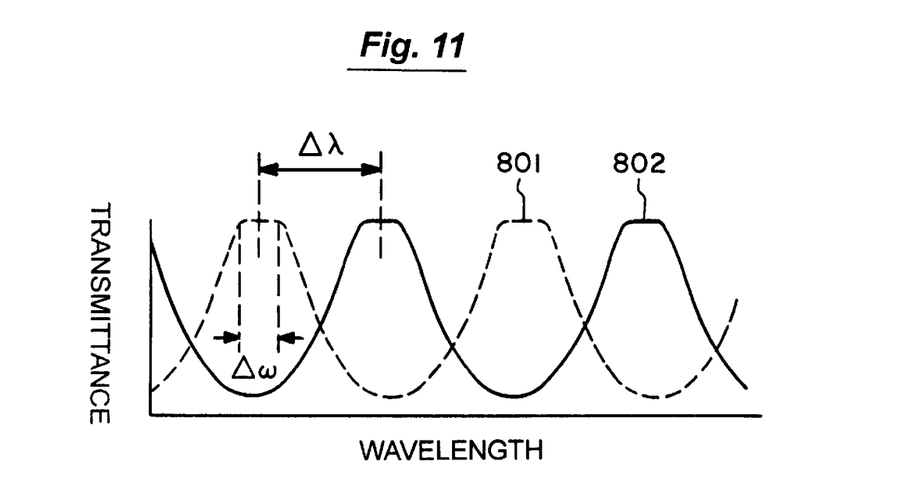
FIG. 11 is a graph showing the transmitted and reflected spectra of the multi-cavity Fabry-Perot etalon in FIG. 10.

Alternatively, an air gap could be used in place of the intermediate layers 702, 704 for each cavity. As shown in FIG. 11, the transmitted and reflected peaks 802, 801 produced by a two-cavity Fabry-Perot etalon 700 offer wider and flatter peaks ($\Delta \omega$) and more rapid fall-off on the sides of the peak tops, which results in greater isolation between the transmitted and reflected beams 802, 801. Returning to FIG. 10, a bi-directional Grinlens coupler 750 can be used to both direct the input beam 800 into the etalon 700 and to separate the reflected beam 801.

This multi-cavity architecture can be extended generally for any number of desired cavities. In general, the output waveforms have progressively wider and flatter peaks, and become progressively more like a square wave as additional cavities are added. The corresponding tradeoffs are added cost and increased signal attenuation as additional cavities are added.

Figure 12:
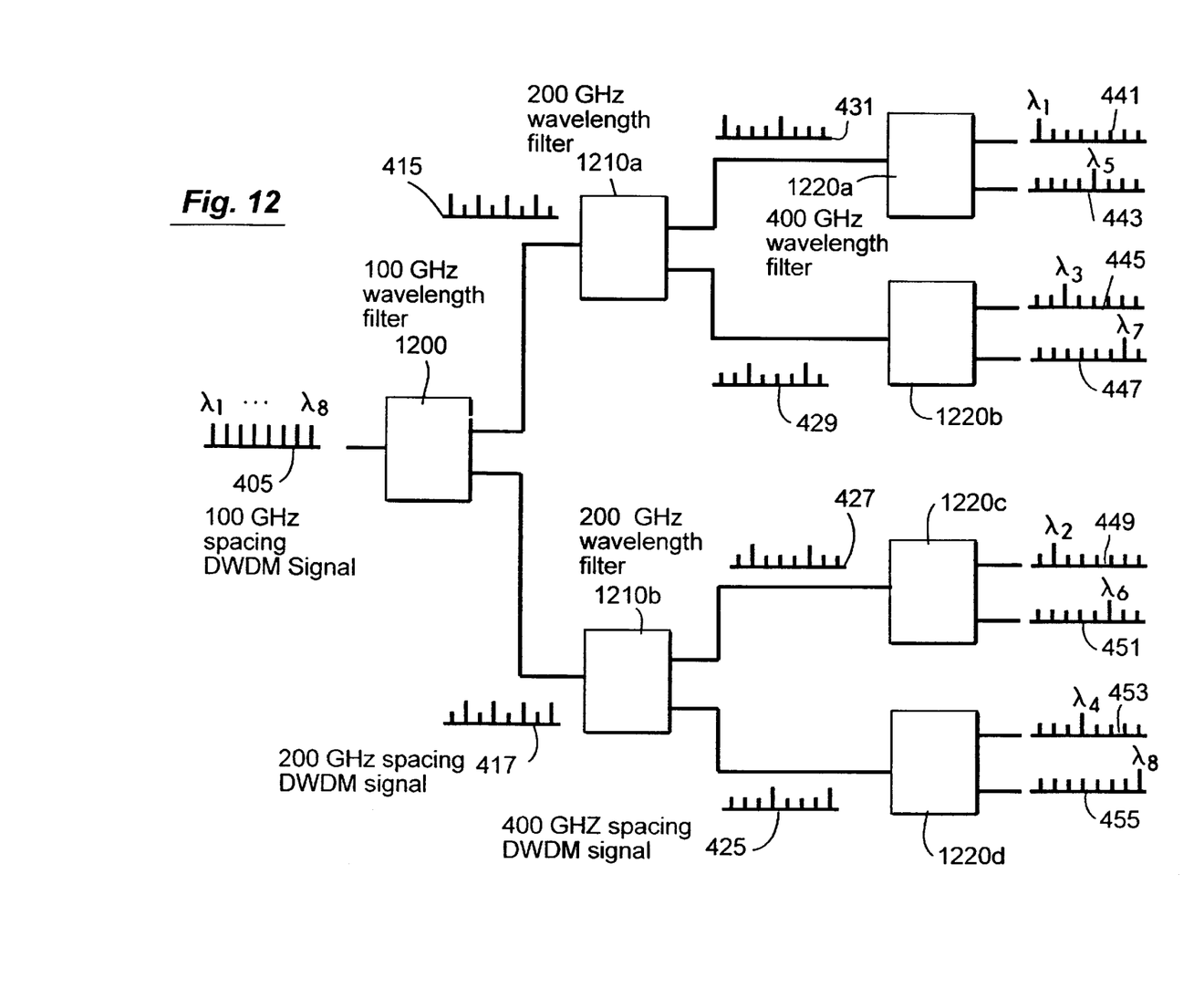
FIG. 12 is a diagram of an embodiment of the present invention using a cascaded network of wavelength demultiplexers.
Figure 13:
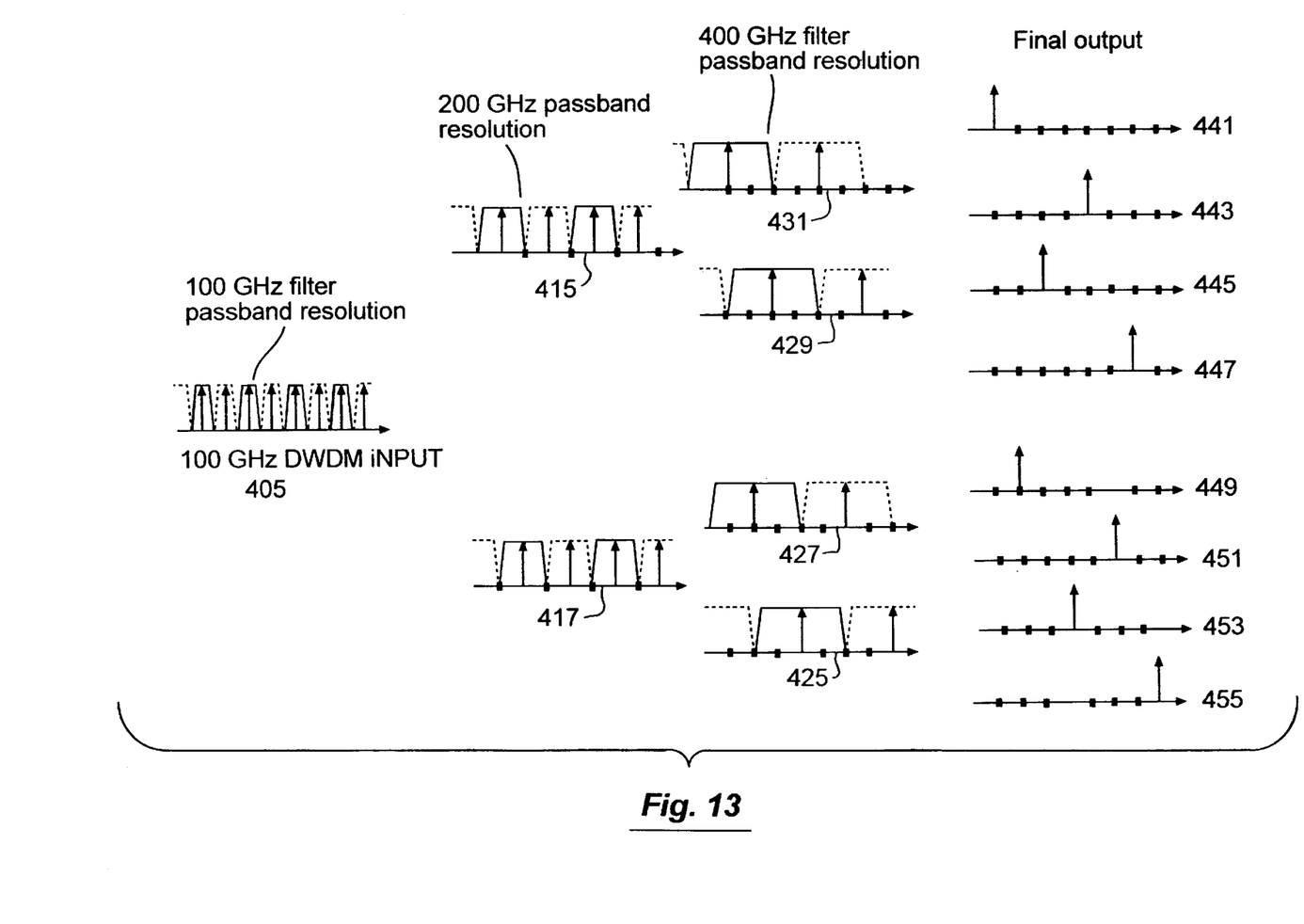
FIG. 13 is a diagram showing the spectral response and filter passband resolution for each of the wavelength demultiplexers in FIG. 12.

FIG. 12 is a diagram of an embodiment of the present invention using a cascaded network of wavelength demultiplexers, such as the multi-cavity Fabry-Perot etalon 700 described above. FIG. 13 is a diagram showing the spectral response and filter passband resolution for each of the wavelength demultiplexers in FIG. 12. Multi-cavity etalons can be used for all or only some of the wavelength demultiplexers in this embodiment. For example, a multi-cavity etalon can be used as the first stage wavelength demultiplexer 1200 to provide the finest wavelength slicing required by the system, and other less expensive wavelength demultiplexers can be used for the subsequent stages 1210a, 1210b, and 1220a–1220d, where looser tolerances are permissible. For example, polarization-based wavelength demultiplexers, arrayed waveguide (AWG) or alternate technologies could be used for the subsequent stages.

The specific embodiment in FIGS. 12–13 has a cascaded network of wavelength demultiplexers 1200–1220d forming a complete binary tree structure with three stages (i.e., wavelength demultiplexer 1200 is the first stage, wavelength demultiplexers 1210a and 1210b form the second stage, and wavelength demultiplexers 1220a–1220d form the third stage). However, it should be expressly understood that any number of stages could be employed, and that less than a complete binary tree could be used according to the requirements of any particular application.

Returning to FIGS. 12 and 13, a 100 GHz-spaced WDM signal 405 enters the first-stage wavelength demultiplexer 1200, which has a spacing ($\Delta\lambda$) between peaks of 100 GHz. The width of each peak is proportionately less than 100 GHz as illustrated by the passband shown at 405 in FIG. 13. This produces an odd-channel 200 GHz spacing WDM signal 415 and an even channel 200 GHz spacing signal 417.

The second stage has two 200 GHz wavelength demultiplexers 1210a and 1210b that produce a 400 GHz spaced signal carrying wavelengths $\lambda_1$ and $\lambda_5$ 431, a signal carrying wavelengths $\lambda_3$ and $\lambda_7$ 429, a signal carrying wavelengths $\lambda_2$ and $\lambda_6$ 427, and a signal carrying wavelengths $\lambda_4$ and $\lambda_8$ 425. The width of each peak (415 and 417) at the second stage is significantly wider than the width of the peaks output by the first stage wavelength demultiplexer 1200. For example, two multi-cavity etalons could be used as the second stage wavelength demultiplexers.

A third stage of wavelength demultiplexers 1220a–d are used to produce the individual channels $\lambda_1$ through $\lambda_8$ on outputs 441, 449, 445, 453, 443, 451, 447 and 455 respectively. Here again, the signal spacing is doubled to 800 GHz, and the width of the passband is correspondingly greater than in the previous stages. Alternatively the final stage of the system could be comprised of optical filters that separate the input signal into individual WDM channels or groups of WDM channels.

Figure 14:
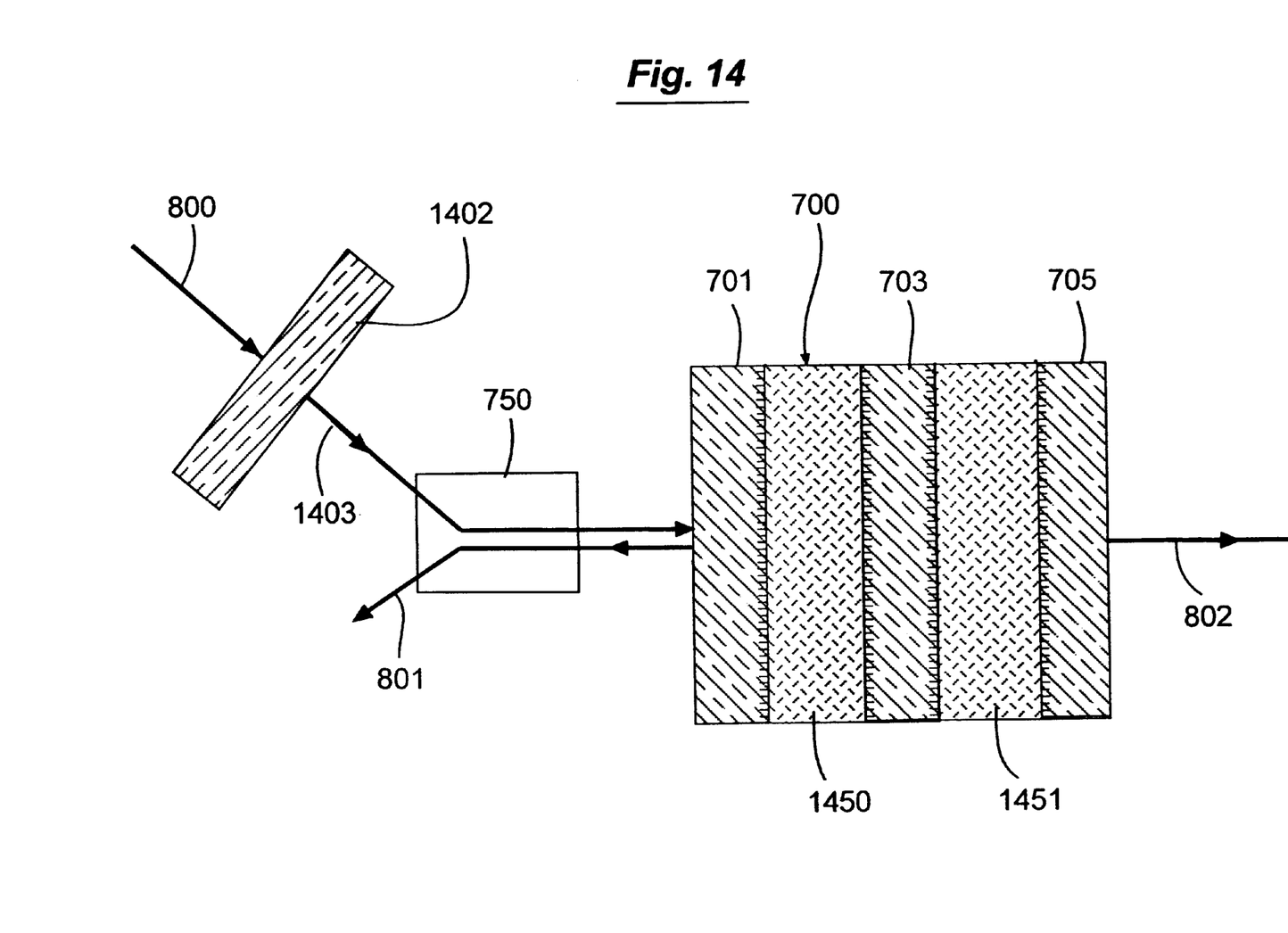
FIG. 14 is a diagram of an alternative embodiment employing a polarization rotator and a multi-cavity etalon with an intermediate birefringent layer.

FIG. 14 is a diagram of an alternative embodiment of the present invention employing a polarization rotator 1402 and a multi-cavity etalon 700 with intermediate birefringent layers 1450 and 1451. The previous embodiment has assumed that the layers of the etalon 700 are made of isotropic materials, such as glass or air. This results in only one pair of output spectra for the etalon, regardless of the polarization of the input optical signal. However, the etalon 700 can be made of anisotropic materials, such as quartz or calcite, to produce output spectra 801, 802 that are polarization dependent. For example, this allows the system to be selectively switched between either of two control states, determined by the polarization of the input beam 1403. A liquid crystal polarization rotator 1402 can be employed to polarize the input beam 800. If the input beam 1403 is horizontally polarized, the etalon 700 produces a first pair of output spectra 801, 802. In contrast, if the input beam 1403 is vertically polarized, the etalon 700 produces a second pair of output spectra. The wavelength characteristics of both pairs of output spectra can be engineered by proper selection of the dimensions and optical properties of the etalon 700. Therefore, it is possible to design the etalon so that the reflected spectra in the first control state is the same as the transmitted spectra in the second control state, and the reflected spectra in the second control state is the same as the transmitted spectra in the first control state. This essentially results in a wavelength demultiplexer whose outputs can be switched between the transmitted and reflected spectra 801, 802 by controlling the state of the polarization rotator 1402.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

We claim:

1. An apparatus for demultiplexing an input wavelength division multiplexed (WDM) signal having a plurality of channels, said apparatus comprising:
   a multi-cavity etalon receiving an input WDM signal and outputting a transmitted spectra and a reflected spectra having a plurality of substantially flat peaks with a first width, wherein said peaks of said transmitted spectra are in alternating relationship with said peaks of said reflected spectra; and
   a wavelength demultiplexer receiving at least a portion of said output spectra from said etalon and outputting a plurality of spectral subsets having a plurality of substantially flat peaks with a second width greater than said first width.

2. The apparatus of claim 1 wherein said etalon comprises a multi-cavity Fabry-Perot etalon.

3. The apparatus of claim 1 wherein said wavelength demultiplexer comprises a second multi-cavity etalon.

4. The apparatus of claim 1 further comprising a cascaded network of wavelength demultiplexers further separating said output spectra of said etalon into a plurality of spectral subsets having a plurality of substantially flat peaks with widths greater than said first width.

5. The apparatus of claim 4 wherein said network comprises a binary tree structure.

6. The apparatus of claim 5 wherein the spacing of said peaks in said spectral subsets increases by a factor of two for each subsequent stage in said network.

7. The apparatus of claim 1 further comprising an optical filter separating at least one of said spectral subsets into individual WDM channels.

8. An apparatus for demultiplexing an input wavelength division multiplexed (WDM) signal having a plurality of channels, said apparatus comprising:
   a first multi-cavity etalon receiving an input WDM signal and producing a first transmitted spectra and a first reflected spectra having a plurality of substantially flat peaks with a first width, wherein said peaks of said first transmitted spectra are in alternating relationship with said peaks of said first reflected spectra; and
   a second multi-cavity etalon receiving at least a portion of said first transmitted spectra and said first reflected spectra and producing a second transmitted spectra and a second reflected spectra having a plurality of substantially flat peaks with a second width greater than said first width, wherein said peaks of said second transmitted spectra are in alternating relationship with said peaks of said second reflected spectra.

9. The apparatus of claim 8 further comprising a wavelength demultiplexer further separating at least a portion of said second transmitted spectra and said second reflected spectra into spectral subsets having a plurality of peaks wider than said first width.

10. The apparatus of claim 8 wherein said first multi-cavity etalon comprises a Fabry-Perot etalon.

11. The apparatus of claim 8 further comprising an optical filter separating at least a portion of said second transmitted spectra and said second reflected spectra into individual WDM channels.

12. The apparatus of claim 8 further comprising a polarization rotator selectively rotating the polarization of an input WDM signal into either of two orthogonal polarizations in accordance with a specified control state; and wherein said first multi-cavity etalon has at least one cavity with a birefringent intermediate layer, said first multi-cavity etalon receiving the polarized input signal and outputting a first transmitted spectra and a first reflected spectra in the first control state, and a second transmitted spectra and a second reflected spectra in the second control state.

13. An apparatus for demultiplexing an input wavelength division multiplexed (WDM) signal having a plurality of channels, said apparatus comprising a network of wavelength demultiplexers including:
   a first wavelength demultiplexer separating an input WDM signal into a plurality of spectral subsets having a plurality of substantially flat peaks with a first width; and
   a plurality of subsequent wavelength demultiplexers separating said spectral subsets from said first wavelength demultiplexer into further spectral subsets having a plurality of substantially flat peaks with widths greater than said first width;
   wherein at least one of said wavelength demultiplexers comprises a multi-cavity etalon outputting a transmitted spectra and a reflected spectra having a plurality of substantially flat peaks, wherein said peaks of said transmitted spectra are in alternating relationship with said peaks of said reflected spectra.

14. The apparatus of claim 13 wherein said network comprises a binary tree structure.

15. The apparatus of claim 13 wherein the spacing of said peaks in said spectral subsets increases by a factor of two for each subsequent stage in said network.

16. The apparatus of claim 13 further comprising an optical filter separating at least one of said spectral subsets into individual WDM channels.

17. An apparatus for demultiplexing an input wavelength division multiplexed (WDM) signal having a plurality of channels, said apparatus comprising:

a polarization rotator selectively rotating the polarization of an input WDM signal into either of two orthogonal polarizations in accordance with a specified control state;

a multi-cavity etalon with at least one cavity having an intermediate layer of a birefringent material, said etalon receiving the polarized input signal and outputting a first transmitted spectra and a first reflected spectra in the first control state, and a second transmitted spectra and a second reflected spectra in the second control state, said transmitted and reflected spectra having a plurality of substantially flat peaks with a first width in an alternating relationship; and a wavelength demultiplexer receiving at least a portion of said output spectra from said etalon and outputting a plurality of spectral subsets having a plurality of substantially flat peaks with a second width greater than said first width.

18. The apparatus of claim 17 wherein said wavelength demultiplexer comprises a second multi-cavity etalon.

19. The apparatus of claim 18 further comprising a cascaded network of wavelength demultiplexers further separating said output spectra of said etalon into a plurality of spectral subsets having a plurality of substantially flat peaks with widths greater than said first width.

20. The apparatus of claim 19 wherein the spacing of said peaks in said spectral subsets increases by a factor two for each subsequent stage in said network.

21. The apparatus of claim 17 further comprising an optical filter separating at least one of said spectral subsets into individual WDM channels.

* * * * *